(12) United States Patent
Jacobi et al.

(10) Patent No.: US 8,573,298 B2
(45) Date of Patent: Nov. 5, 2013

(54) METHOD FOR PETROPHYSICAL EVALUATION OF SHALE GAS RESERVOIRS

(75) Inventors: David J. Jacobi, The Woodlands, TX (US); Mikhail N. Gladkikh, The Woodlands, TX (US); Brian J. LeCompte, Tomball, TX (US); Freddy E. Mendez, Kingwood, TX (US); Gabor Hursan, The Woodlands, TX (US); See Hong Ong, Sugar Land, TX (US); John M. Longo, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 1136 days.

(21) Appl. No.: 12/098,927

(22) Filed: Apr. 7, 2008

(65) Prior Publication Data

US 2009/0254283 A1    Oct. 8, 2009

(51) Int. Cl.
*E21B 47/00* (2012.01)

(52) U.S. Cl.
USPC ..................................................... 166/254.2

(58) Field of Classification Search
USPC ........................................ 166/254.2, 250.16
See application file for complete search history.

(56) References Cited

U.S. PATENT DOCUMENTS

| | | | | |
|---|---|---|---|---|
| 4,686,364 | A | * | 8/1987 | Herron ........................... 250/256 |
| 5,416,697 | A | * | 5/1995 | Goodman ........................... 702/9 |
| 5,909,772 | A | * | 6/1999 | Merkel et al. ............. 166/250.16 |
| 2003/0062158 | A1 | | 4/2003 | Spross |
| 2005/0171697 | A1 | | 8/2005 | Heliot et al. |
| 2006/0033023 | A1 | * | 2/2006 | Pemper et al. ............. 250/269.6 |
| 2007/0246649 | A1 | | 10/2007 | Jacobi et al. |
| 2008/0202745 | A1 | * | 8/2008 | Levy ........................ 166/250.03 |

FOREIGN PATENT DOCUMENTS

KR    1019800000004    1/1980

OTHER PUBLICATIONS

Richard Pemper et al., A New Pulsed Neutron for Derivation of Formation Lithology and Mineralogy, SPE 102770, 2006, pp. 13, San Antonio, Texas, USA.
Daniel M. Jarvie et al., Assesment of the Gas Potential and Yields from Shales: The Barnett Shale Model, Oklahoma Geological Survey Circular 110, 2005, 2005, pp. 37-50.
Petroleum Systems International, Inc, [online]; [retrieved on Apr. 30, 2008] retreived from the Internet http://www.petroleumsystems.com/print-view.asp?page=presentations/Barnett-Shalec.asp Daniel ,. Jarvie et al., "Evaluation of unconventional natural gas prospects in the Barnett Shale: Fractured shale gas model." IMOG Research Conference Krakow, Poland, Jan. 2003, pp. 3.
Charles Boyer et al., Producing Gas from its Source, 2006, pp. 36-49.
A. V. Kochenov et al., The Paragenesis of Organic Matter, Phosphorus, and Uranium in Marine Sediments, Lithology and Mineralogy Resources, vol. 37, No. 2, 2002 pp. 107-120. Translated from Litologiya i Poleznye, No. 2, 2002 pp. 126-140. Original Russian Text Copyright 2002 by Kochenov, Baturin.
Robert G. Loucks et al., Barnett Shale-gas Play of the Fort Worth Basin, Bureau of Economic Geology, 2006 pp. 1-177.

(Continued)

*Primary Examiner* — David Andrews
(74) *Attorney, Agent, or Firm* — Cantor Colburn LLP (57) ABSTRACT

A method for evaluating an earth formation from a well bore, that includes: collecting at least one of geochemical data, petrophysical data and geomechanical data from a wellbore; and identifying depositional facies of the earth surrounding the wellbore. A computer program product and a system are provided.

23 Claims, 4 Drawing Sheets

(56) References Cited

OTHER PUBLICATIONS

International Search Report for International Application PCT/US2009/039749. Mailed Nov. 11, 2009.

Written Opinion of the International Searching Authority for International Application PCT/US2009/039749. Mailed Nov. 11, 2009.

Adams, J.S. and Weaver, C.E., 1958, Thorium-Uranium Ratios as Indicators of Sedimentary Processes: Example of Concept of Geochemical Facies, AAPG Bulletin, 42(2), p. 387-430.

Calvert S.E. and Pederson T.F., 1993, Geochemistry of Recent Oxic and Anoxic Marine Sediments: Implications for the Geological Record, Marine Geology 113, 67-88.

Fisher, M.K., Wright, C.A., Davidson, B.M., Goodwin, A.K, Fielder, E.O., Buckler, W.S., and Steinsberger, N.P., 2005, Integrating Fracture-Mapping Technologies to Improve Stimulations in the Barnett Shale, SPE paper 77441.

Frantz, J.H., Williamson, J.R., Sawyer, W.K., Johnston, D., Waters, G., Moore, L.P., MacDonald, R.J., Pearcy, M., Ganpule, S.V., and March, K.S., 2005, Evaluating Barnett Shale Production Performance Using an Integrated Approach, SPE paper 96917.

Givens, N., and Zhao, H., 2004, The Barnett Shale: Not So Simple After All, AAPG Annual Meeting Program, v.13, A52.

Grieser, B., Shelley, B., Johnson, B.J., Fielder, E.O., Heinze, J.R., and Werline, J.R., 2006, Data Analysis of Barnett Shale Completions, SPE paper 100674.

Hickey, J., and Henk, B., 2007, Lithofacies Summary of the Mississippian Barnett Shale, Mitchell 2 T.P. Sims Well, Wise County, Texas, AAPG Bulletin, 91(4), 437-443.

Jarvie, D.M., Hill, R.J., Ruble, T.E., and Pollastro, R.M., 2007, Unconventional Shale-Gas Systems: The Mississippian Barnett Shale of North-Central Texas as One Model for Thermogenic Shale-Gas Assessment, AAPG Bulletin, 91(4), 475-499.

Lancaster, D. E., McKetta, S.F., Hill, R.E., Guidry, F.K., and Jochen, J.E., 1992, Reservoir Evaluation, Completion Techniques, and Recent Results From the Barnett Shale Development in the Fort Worth Basin, paper SPE 24884.

Le Calvez, J.H., Tanner, K.V., Glenn, S., Kaufman, P., Sarver, D.S., Bennett, L., Panse, R., and Palacio, J.C., 2006, Using Induced Microseismicity to Monitor Hydraulic Fracture Treatment: A Tool to Improve Completion Techniques and Reservoir Management, SPE paper 104570.

Loucks, R.G., and Ruppel, S.C., 2007, Mississippian Barnett Shale: Lithofacies and Depositional Setting of a Deep-Water Shale-Gas Succession in the Fort Worth Basin, Texas, AAPG Bulletin, 91(4), 579-601.

Martineau, D.F., 2007, History of the Newark East Field and the Barnett Shale as a Gas Reservoir, AAPG Bulletin, 91(4), 399-403.

Martini, A.M., Walter, L.M., Ku, T.C.W., Budai, J.M., McIntosh, J.C., and Schoell, M., 2003, Microbial Production and Modification of Gases in Sedimentary Basins: A Geochemical Case Study from a Devonian Shale Gas Play, Michigan Basin, AAPG Bulletin, 87(8), 1355-1375.

Mayerhofer, M.J., Lolon, E.P., Youngblood, J.E., and Heinze, J.R., 2006, Integration of Microseismic Fracture Mapping Results with Numerical Fracture Network Production Modeling in the Barnett Shale, SPE paper 102103.

Montgomery, S.L., Jarvie, D.M., Bowker, K.A., and Pollastro, R.M., 2005, Mississippian Barnett Shale, Fort Worth Basin, North-Central Texas: Gas-Shale Play with Multi-Trillion Cubic Foot Potential, AAPG Bulletin, 89(2), pp. 155-175.

Moore, L.P., and Ramakrishnan, H., 2006, Restimulation: Candidate Selection Methodologies and Treatment Optimization, SPE paper 102681.

Papazis, P., 2005, Petrographic Characterization of the Barnett Shale, Fort Worth Basin, Texas, Master's Thesis, University of Texas at Austin, Austin, TX, 142 p., available from Bureau of Economic Geology, University of Texas at Austin.

Pollastro, R.M., Hill, R.J., Jarvie, D.M., and Henry, M.E., 2003, Assessing Undiscovered Resources of the Barnett-Paleozoic Total Petroleum System, Bend Arch—Fort Worth Basin Province, Texas, AAPG Southwest Section Convention, Fort Worth Texas, Mar. 1-5, 2003.

Singh, P., Slatt, R., Rai, C., Sondergeld, C., and Stamm, C., 2007, Stratigraphy of the Barnett Shale, Newark East Field, Texas, AAPG Southwest Section Convention, Wichita Falls, TX, Apr. 2007.

Vernik, L., and Nur, A., 1992, Ultrasonic Velocity and Anisotropy of Hydrocarbon Source Rocks, Geophysics, 37 (5), 727-735.

* cited by examiner

METHOD FOR PETROPHYSICAL EVALUATION OF SHALE GAS RESERVOIRS

BACKGROUND OF THE INVENTION

1. Field of the Invention

The invention disclosed herein relates to exploration for hydrocarbons and, in particular, to the evaluation of shale deposits.

2. Description of the Related Art

Shale gas reservoirs have been a source of natural gas for U.S. industry since its earliest days. As gas prices increase, unconventional gas development plays a larger role in the gas supply. While gas demand continuously grows and conventional reservoirs deplete, unconventional plays provide an increasingly significant contribution to the overall gas supply. It is clear this trend will continue into the future.

In the quest for gas, many types of geologic materials and formations are encountered. A descriptive term for characterizing the many types is that of "facies." As commonly used, a facies is a body of rock with specified characteristics. Ideally, a facies is a distinctive rock that forms under certain conditions of sedimentation, reflecting a particular process or environment.

Identifying and characterizing the individual facies in shale gas reservoirs is a key towards understanding and predicting potential reservoir productivity. Each zone or interval facies is unique in its geochemical, petrophysical, and mineralogical properties. All of these properties influence the geomechanical properties of each facies. The geomechanical properties of facies are especially important because hydraulic fracturing is a method frequently used to stimulate and enhance gas productivity. Thus, detecting changes in rock integrity aid in planning these stimulation procedures. While a variety of technologies are useful for such detection, ever improved technologies are needed.

Therefore, what are needed are improved techniques for detecting changes in the integrity of shale deposits. Preferably, the techniques provide for developing a strategy for fracturing the shale deposits, which is based upon an understanding of the geomechanical properties of the facies, and results in not only saved costs during initial fracture, but may also can reduce the number of wells which require re-stimulation.

BRIEF SUMMARY OF THE INVENTION

Disclosed is a method for evaluating an earth formation from a well bore, that includes: collecting at least one of geochemical data, petrophysical data and geomechanical data from a wellbore; and identifying depositional facies of the earth surrounding the wellbore.

Also disclosed is a computer program product including machine readable instructions stored on machine readable media, the instructions for classifying a property of a zone in a wellbore traversing a facies of shale, the product implementing a method including: receiving input data comprising at least one of geochemical data, petrophysical data and geomechanical data; estimating at least one weight fraction of a mineral present in the input data; and classifying the zone in the wellbore as one of a perforation zone and a zone of fracture energy attenuation according to the estimating.

Further disclosed is a system for evaluating properties of an earth formation, that includes: an input for receiving input data comprising at least one of geochemical data, petrophysical data and geomechanical data descriptive of earth surrounding a wellbore; a processor for processing the input data and estimating at least one of a weight fraction and a concentration for at least one mineral in the earth; and an algorithm for classifying properties of the earth formation according to at least one of the weight fraction and the concentration.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION OF THE INVENTION

Disclosed are techniques for detecting properties of geologic formations. The techniques disclosed are discussed primarily in terms of shale and shale deposits, however, this is merely illustrative and not limiting of the invention.

The teachings herein provide for evaluation of a gas reservoir including: computation of total organic carbon (TOC); identification of depositional facies within a shale deposit; and determination of zones useful for inducing and supporting fractures as well as zones that potentially might serve as fracture energy attenuators.

As discussed herein, the term "gas reservoir" generally makes reference to deposits of gas within geologic formations. Accordingly, a gas reservoir may include gas that is contained within pore space, absorbed gas, adsorbed gas, and other forms or retentions of gas.

In general, the teachings herein provide for an expert system to determine the character of depositional facies in shale. The expert system makes use of data collected with known technologies, such as geochemical logging data, porosity data, acoustic data, and density data to determine the presence of any particular facies. Other information, such as data collected by cuttings and core study may be used. As an outcome, users are provided with a capability to identify potential gas plays and design appropriate well fracture and completion methods.

It should be recognized that the teachings herein are not limited to use in any particular type of shale or shale in general. Therefore, although presentation of various embodiments herein is with regard to shale, these embodiments are illustrative and non-limiting. For example, it should be recognized that other types of formations may call for adjustment to constants, parameters, sampling techniques, types of sample data, instrumentation and other such characteristics or contributing factors as deemed appropriate.

The expert system may be provided as an algorithm. The expert system may make use of various processing infrastructure components and resources known in the art of computing. Inputs to the expert system include data from a variety of instrumentation, including downhole instruments. The algorithm may be implemented as machine executable instructions stored on machine readable media. That is, the algorithm may be implemented as software and executed by a processor, computer, circuit or other type of machine.

Figure 1:
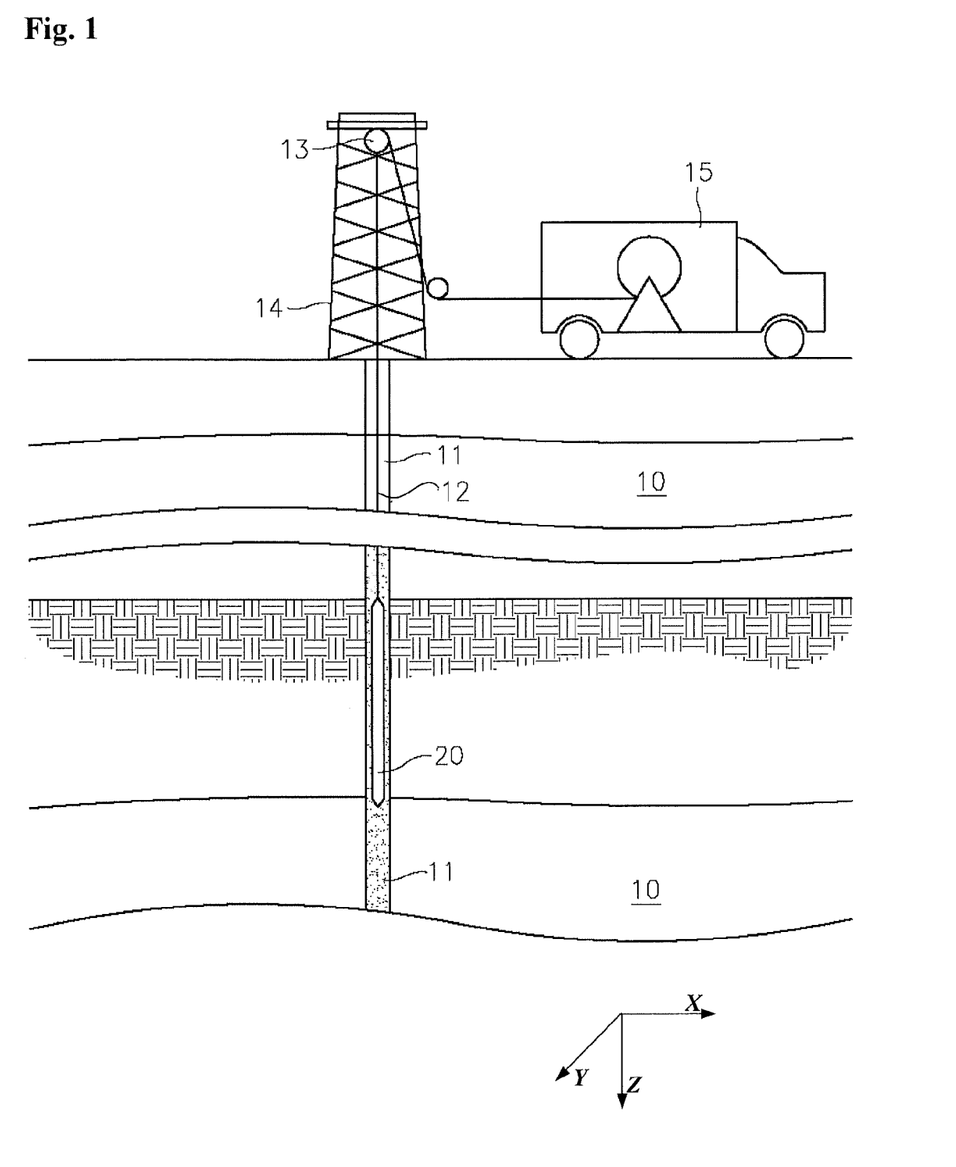
FIG. 1 depicts an instrument in use for collection of data downhole.

Referring to FIG. 1, a cross-section of earth 10 along the length of a penetration referred to as a "borehole" 11 is depicted. Usually, the borehole 11 (also referred to as a "wellbore") is at least partially filled with a mixture of liquids including water, drilling fluid, and formation fluids that are indigenous to the earth formations penetrated by the borehole 11. Suspended within the borehole 11 and mechanically and electrically connected at the bottom end of a wireline 12 is an assembly of one or various logging instruments 20, responding to formation and fluid characteristics the assembly of which is capable of sending the information to the surface. The upper end of the wireline 12 is linked to electronic devices (not shown) to retrieve the data. The wireline 12 is often carried over a pulley 13 supported by a derrick 14. Wireline 12 deployment and retrieval is typically performed by a powered winch carried by a service truck 15.

In general, a coordinate system for describing a location of the sampling instrument 20 includes a Z-axis, a Y-axis and a X-axis. In the embodiments depicted, the Z-axis describes a vertical component of the coordinate system.

Numerous embodiments of sampling instruments are known. Sampling instruments may include coring instruments used for retrieving core samples from the borehole 11. Other non-limiting examples of instruments 20, or associated services provided by the instrument 20, are referred to as geochemical logging sondes, natural gamma ray and sonic instruments, and other such instruments, some of which are described below.

The geochemical logging tool provides geochemical information which can be analyzed with special software to depict lithological and quantitative mineralogical information for accurate formation evaluation. The assessment begins with elemental formation weights and follows with an interpretation of lithology and mineralogy. Lithologies are divided into general categories including sand, shale, coal, carbonates, and evaporites. Potentially identifiable minerals are quartz, potassium-feldspar, albite, calcite, dolomite, siderite, anhydrite, illite/smectite, kaolinite, glauconite, chlorite, pyrite, and others. The logging system utilizes an electronic pulsed source to send high energy neutrons into the surrounding formation. These neutrons quickly lose energy as a result of scattering, after which they are absorbed by the various atoms within the ambient environment. The scattered as well as the absorbed neutrons cause the atoms of the various elements to emit gamma rays with characteristic energies. These are measured with a scintillation detector, resulting in both inelastic and capture gamma ray energy spectra. A matrix inversion spectral fit algorithm is used to analyze these spectra in order to separate the total response into its individual elemental components. The prominent measured elements associated with subsurface rock formations include calcium, silicon, magnesium, carbon, sulfur, aluminum, and iron. Potassium, thorium, and uranium are measured separately with a natural gamma ray spectroscopy instrument. As discussed herein, data collected with this instrument 20, or an equivalent thereof, is generally considered "geochemical data," and by other similar terms.

Embodiments of the natural gamma ray logging sonde generally used in support of the teachings herein differs from a standard gamma ray instrument—which records total gamma rays as a function of depth—in that it also measures the discrete energy of each gamma ray detected. By separating the total gamma ray signal into its components, the service can assist customers in locating fracture zones, identifying the lithology of subsurface formations, measuring bed thickness, correlating zones of interest between wells, and making qualitative estimates of formation permeability. The discrimination of the total gamma ray signal into discrete energy levels or windows infers the individual amounts of potassium (K), uranium (U), and thorium (Th). Virtually all of the gamma radiation detected by downhole instruments can be classified in one of three categories. As a result, certain lithology ambiguities can be resolved which often exist when using only total gamma ray signal.

For example, given a high total gamma ray count over a given interval, the signal could be indicative of a shale zone. If that signal was mostly composed of uranium gamma rays, it could be indicative of a fault plane where uranium-carrying fluid had migrated. As discussed herein, data collected with this instrument 20, or an equivalent thereof, is generally considered "natural gamma data," and by other similar terms.

The nuclear magnetic resonance (NMR) instrument delivers the benefits of previous nuclear magnetic resonance (NMR) systems while acquiring data more quickly and providing high-quality results in almost any borehole environment. For example, the NMR instrument includes features such as a side-looking antenna and a gradient magnetic field for formation evaluation measurements and fluid analysis in almost any borehole environment regardless of borehole size, borehole deviation, or borehole conductivity. The side-looking design mitigates the effects of conducting drilling mud on the NMR data quality. The NMR offers multiple-frequency operation for faster logging and multiple, simultaneous NMR experiments in a single logging pass. The NMR sonde service also features innovative data acquisition sequences known as Objective Oriented Acquisitions (OOA), which greatly simplify planning and execution of NMR logging jobs. The choice of OOA is based on your NMR data needs. For porosity, fluid volumes, and permeability evaluations, a "PoroPerm" mode may be used. If additional evaluations are needed on the quantities and types of fluids present, then the PoroPerm+Gas, PoroPerm+Oil or PoroPerm+Heavy Oil mode may be used. These advanced NMR acquisition techniques provide for improved NMR data accuracy and superior hydrocarbon typing and fluids analysis. As discussed herein, data collected with this instrument 20, or an equivalent thereof, is generally considered "nuclear magnetic resonance (NMR) data," and by other similar terms.

The acoustic logging sonde instrument and service provides for formation evaluation, seismic correlation and geomechanics information through acoustic measurement technologies for determination of shear and compressional slowness. In general, this instrument acquires fullwave monopole, inline and cross-dipole data. This instrument is particularly useful for acquiring quality compressional and shear measurements over a broad range of borehole environments.

During manufacturing of one embodiment, the X and Y dipole transmitters are matched and configured at the same physical offset. These features provide significantly improved performance, with accurate measurements in a wider range of environments. Because the transmitters are at the same physical offset, eight four-component cross dipole measurements are obtained. The lower frequency content provides accurate shear data without dispersion corrections, improving performance in slow formations and in large boreholes. The mandrel is configured with eight receivers, each having four orthogonal transducers for true four-component cross dipole acquisition.

Using this instrument, shear slowness measurements can be confidently acquired. Inline and cross line shear receivers at same depth provide for cross dipole acquisition. Each of the eight acoustically isolated monopole and dipole measurements are made at the same location on the mandrel eliminating depth reference and tool rotation problems. Receivers exhibit linear move out over the array in soft formations. As discussed herein, data collected with this instrument 20, or an equivalent thereof, is generally considered "acoustic data," and by other similar terms.

It should be noted that the teachings disclosed herein may be used in conjunction with instruments such as the foregoing and equivalents thereof, including numerous other instruments and tools useful for subterranean measurements. Other exemplary forms of data include, without limitation, density data, resistivity data and image data. Further, the teachings herein may take advantage of aspects of other supporting structures, mechanisms and methods as may be included with such other instruments and tools.

Figure 2:
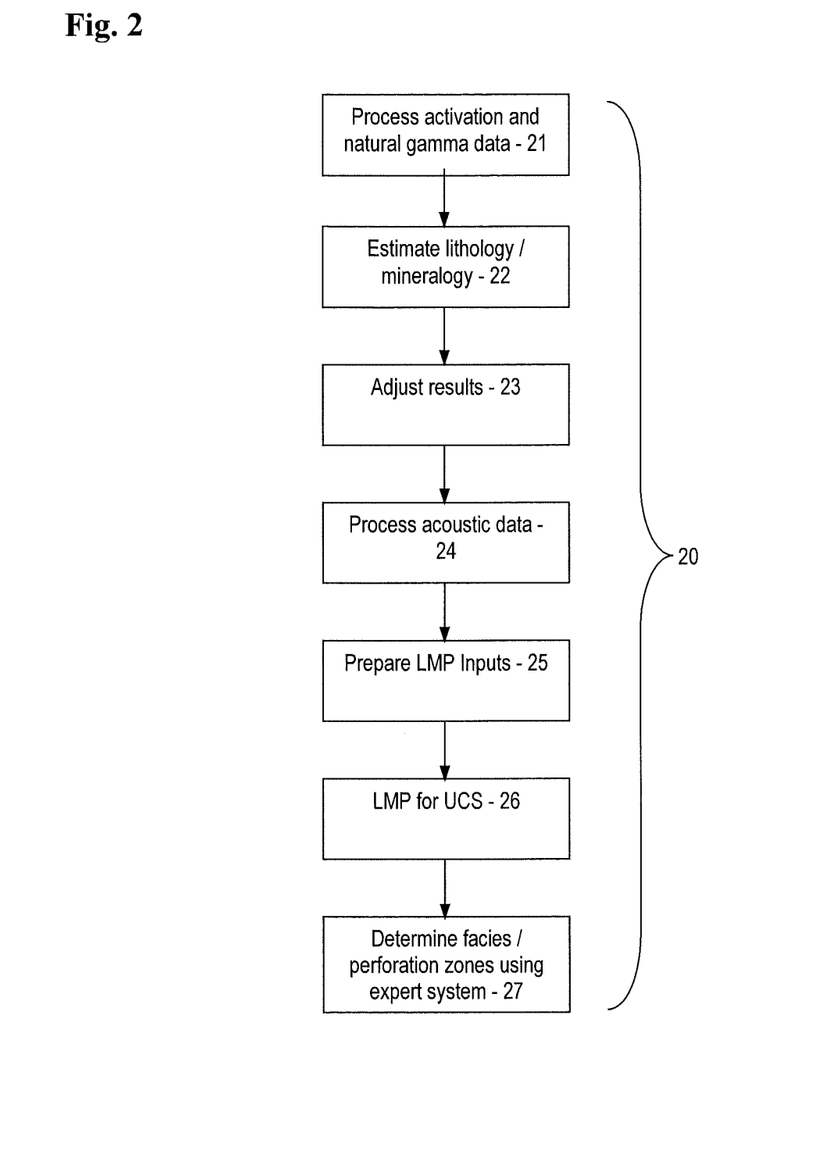
FIG. 2 depicts an exemplary method for collecting and qualifying data as inputs to the expert system disclosed herein.

Refer now to FIG. 2, where there is shown an exemplary method 20 for collecting formation data from down the borehole 11 (or "downhole"). A first stage 21, begins with collection of geochemical data and natural gamma data. The data is checked for quality and then processed (estimated) into the weight fractions of silicon (Si), calcium (Ca), iron (Fe), aluminum (Al), magnesium (Mg), titanium (Ti), gadolinium (Gd), carbon (C), sulfur (S), potassium (K). Uranium (U) and thorium (Th) are given in parts per million (i.e., as a concentration). Accurate processing of geochemical data is a critical part for effective interpretation of shale facies. Because some embodiments of shale include a relatively low-clay, siliclastic shale, and has many other distinct facies, the geochemical data helps resolve ambiguities remaining from conventional log analysis. For example, a zone with higher density could indicate an increase in calcite, but the geochemical data may show that it is actually a pyritic concretion. This information may make the difference as to whether that zone is preferable for fracture initiation.

The first stage 21 may include analysis of total organic carbon (TOC), as desired. The total organic carbon may be estimated by use of geochemical data, core data and by other techniques as deemed suitable (such as computation from indicating parameters).

In a second stage 22, after processing of the geochemical data and the natural gamma data, results are input into software to convert elemental weight fractions into mineral weights and volumes.

In a third stage 23, an analyst then reviews output of the software and compares it with prior geological knowledge about the particular field. Adjustments of results are made as appropriate to the processing parameters until the results are considered reasonable.

In a fourth stage 24, acoustic data, is processed to provide acoustic velocities for surrounding formations and materials in the earth 10.

As a fifth stage 25, inputs are introduced into geomechanical software program. Then, in a sixth stage 26, geomechanical properties of the surrounding earth 10 is determined. In some embodiments, the sixth stage 26 makes use of software that derives rock mechanical properties such as unconfined compressive strength (UCS) from a simulation of small core samples calculated from density, acoustic velocities and lithological log data.

In general, geomechanical software requires acoustic data and mineralogical information. Most often, geomechanical software is set up to run in a sand/shale or carbonate/shale environment. In order to accommodate some types of shale, such as a siliclastic low-clay shale, the analyst must transform mineralogy of the shale into 'soft' and 'hard' minerals for input into geomechanical software. That is, such inputs are generally analogous to sand/shale. The 'soft' minerals include all of the clays: illite, smectite, kaolinite, chlorite, glauconite, and any kerogen or coal content. The rest of the mineralogy output of the software (apatite, zeolites, salt, anhydrite, hematite, pyrite, siderite, dolomite, calcite, k-feldspar, plagioclase, and quartz) comprises the 'hard' minerals that make up the sand fraction. Because this complex mineralogical data is converted to a binary sand/shale model, the resultant UCS does not take into account the geomechanical properties of the individual minerals. Thus results of geomechanical software processing are generally used only in a relative sense, where the lower UCS values indicate possible fracture initiation zones and the greatest UCS values indicate less likely fracture zones.

With regard to FIG. 2, it is considered that the first stage 21 through the sixth stage 26 generally provide for determination/estimation of geochemical and geomechanical properties of surrounding earth formations. In addition, other aspects discussed herein, such as use of nuclear magnetic resonance data, resistivity data, use of core samples and cutting samples as well as imaging data may be used to further determine or estimate the geochemical and geomechanical properties of the surrounding earth formations.

Once the unconfined compressive strength is calculated from geomechanical software processing, the facies and fracture placement can be determined. More specifically, as identified in this exemplary method 20, in a seventh stage 27, any zones of optimal fracture initiation are pointed out using an expert system. The expert system generally takes into account the facies and other logs. Aspects of the expert system are discussed in detail further herein. However, prior to discussion of the expert system and an exemplary algorithm, some further context is provided.

Aspects of the expert system are now discussed with regard to examination of gas reservoirs in shale. Specifically, in this embodiment, the expert system is described in the context of Barnett Shale. Of course, one skilled in the art will recognize that the teachings herein may be adjusted to suit other lithologies, geologies, formations or other characteristics as deemed suitable. Accordingly, the teachings herein should not be construed as limited to use in Barnett Shale or other shale.

Several authors have studied core and thin sections data and described various depositional facies present in Barnett Shale. For example, the following authors have considered the Barnett Shale: Papazis, 2005; Jarvie et al, 2005; Hickey and Henk, 2007; Loucks and Ruppel, 2007 and Singh et al, 2007. Generally, the Barnett interval includes a variety of lithofacies, which are dominated by fine-grained (clay-size to silt-size) sediment with high (40-50%) quartz content. Thus, portions should be classified more accurately as "mudstone" rather than "shale." That is, the portions are not fissile. One author of early petrographic studies of Barnett thin sections recognized five different facies (Papazis, 2005). The five different facies include: black shale (organic and silica rich); calcite-rich intervals; silt-rich and phosphate-rich black shale; coarse grain accumulations (mostly carbonates); and pyretic concretions.

Other classifications have been determined, and include: silica-rich organic shale, fossiliferous shale; as well as phosphatic, dolomitic, and concretionary carbonate zones. In addition, distinctions have been identified in silica-rich mudstone and calcareous mudstone, as well as phosphatic deposits.

Chemostratigraphic analysis presented above and possible sequence stratigraphy of Barnett formation suggest that U and Th/U ratio might be used to identify various lithofacies, helping to distinguish between intervals of sea rise and fall levels. With the addition of geochemical logging sonde data (chemistry and mineralogy), it becomes possible to identify various depositional facies described in the papers discussed above. Most importantly, it is possible to identify silty intervals (quartz-rich, brittle zones corresponding to leached continental environment), organic-rich black shale (high kerogen content and source of absorbed gas), calcareous zones (possible zones of fracture energy attenuation), and phosphatic facies (very important to distinguish from organic-rich intervals, see above).

Figure 3:
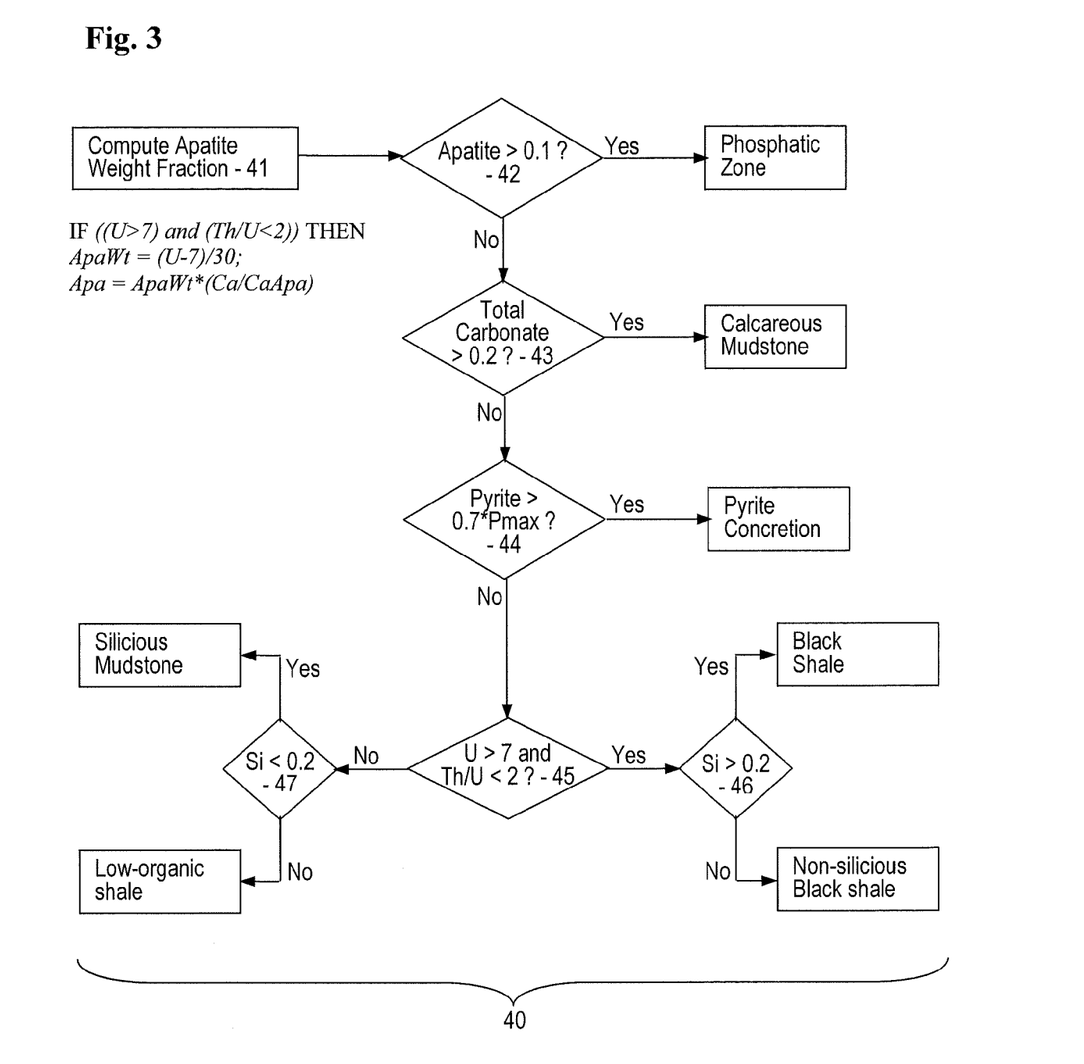
FIG. 3 depicts an exemplary algorithm for identifying facies in shale.

Based on the data and analysis in the literature of the logging data, an algorithm for identifying depositional facies in Barnett Shale was developed. This algorithm is presented in FIGS. 3 and 4. The algorithm of FIG. 3 is considered a rule-based expert system 40. The expert system 40 makes use of natural gamma ray data (U and Th), and geochemical logging data that provides for elemental data (Ca and Si) and mineral (calcite, dolomite, and pyrite) curves as input data. This embodiment of the expert system 40 distinguishes seven different lithofacies in the Barnett Shale. The lithofacies include: organic-rich shale (Si-rich, high total organic carbon (TOC)); calcareous mudstone (low TOC, possible zone of frac energy attenuation); siliceous mudstone (low U, Si-rich, leached continental zone, preferable perforating interval); phosphatic zone (high apatite content, high TOC, possible zone of fracture energy attenuation); low-organic shale (low TOC, soft); pyritic zone (high pyrite content, associated with high TOC); and non-siliceous organic-rich shale (low Si, high clay content and high TOC, poor for perforating).

In this embodiment of the expert system 40, the algorithm includes a plurality of decision points, each one referred to as a "stage." In the first stage 41, the algorithm computes a weight fraction of apatite. In a second stage 42, if the weight fraction of apatite is > than a given value (such that the value is between about 0.05 to about 0.15), the algorithm identifies this interval as a phosphatic zone. If this weight fraction is < a given value value (such that the value is between about 0.05 to about 0.15), the algorithm goes on to a third stage 43 and checks the total weight fraction of carbonate computed from software (that is, the weight fraction of calcite plus dolomite). In the third stage 43, if the weight fraction of carbonate is > a given value (such that the value is between about 0.01 to about 0.25), the algorithm identifies this interval as calcareous mudstone (calcitic or dolomitic). If not, the algorithm checks the weight fraction of pyrite, and progresses to a fourth stage 44. In the fourth stage 44, if the weight fraction of pyrite is > a given value $*P_{max}$ (such that the value lies between about 0.4 and about 1.0), where $P_{max}$ represents the maximal weight fraction of pyrite present in the whole Barnett Shale interval, the zone is described as a pyritic concretion. If not, the algorithm checks the value of Uranium and the Th/U ratio, and progresses to a fifth stage 45. In the fifth stage 45, if U is > than a value in ppm (such that the value is between about 3 and about 10 ppm) and Th/U is < than a given value (such that the value is between about 0.5 and about 3), it is considered that this interval was deposited in a fixed marine environment associated with a rise in sea level, and then goes on to a sixth stage 46. In the sixth stage 46, if the weight fraction of silica is > a given value (such that the value is between about 0.05 and about 0.45), the algorithm identifies this interval as silica-rich and organic-rich black shale, and if not, the algorithm identifies this interval as non-silicious organic-rich black shale. In the fifth stage 45, if U is not > a given value (such that the value is between about 3 and about 10 ppm) and Th/U is not < than a given value (such that the value is between about 0.5 and 3) then the algorithm goes on to a seventh stage 47. In the seventh stage 47, if U is < a value in ppm (such that the value is between about 3 and about 10 ppm) ppm and Th/U is > than a given value (such that the value is between about 0.5 and about 3), it is considered that this interval was deposited in a leached continental environment associated with a fall in sea level. By checking the weight fraction of silica, the algorithm identifies either one of siliceous mudstone (weight fraction of silica > than a given value (such that the value is between about 0.05 and about 0.45) or low-organic, low-silica shale < than a given value (such that the value is between about 0.05 and about 0.45).

Figure 4:
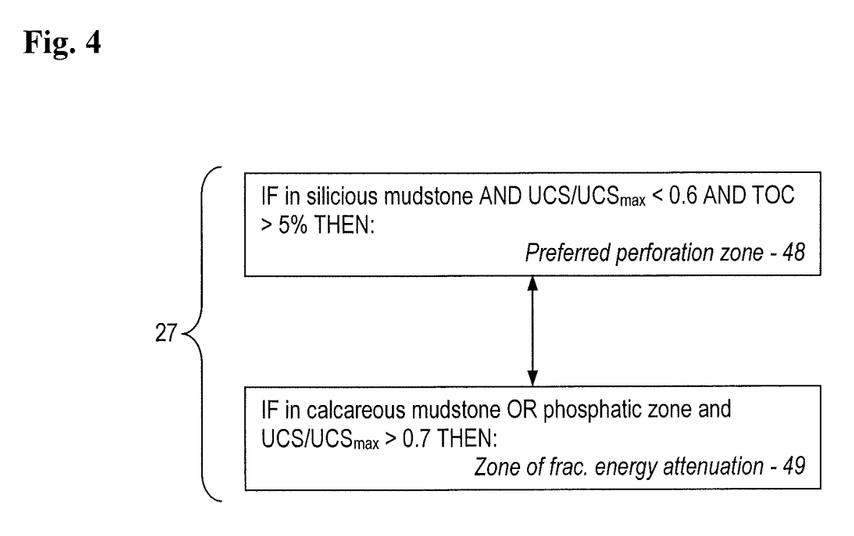
FIG. 4 depicts an exemplary algorithm for identification of zones and intervals of fracture energy attenuation.

Referring now to FIG. 4, further stages of the expert system 40 are provided. Also referring back to FIG. 2, the seventh stage 27 of the exemplary method 20 calls for identifying any perforation zones and zones of frac energy attenuation. As shown in FIG. 4, selection of these zones may be based on output of the expert system 40 as well as previously estimated data, such as TOC (total organic carbon), UCS (unconfined compressive strength), and depositional facies. More specifically, results of geomechanical properties analysis for formation mechanical properties and an UCS curve computed by geomechanical software analyses may be used as inputs. In this example, high values of UCS indicate harder formations while lower values correspond to softer and more brittle intervals. Since the character of Barnett Shale, its composition, mineralogy, and geomechanical properties are very complicated, the UCS curve is used generally for qualitative purposes. For example, the maximal value of UCS ($UCS_{max}$) may be computed for the whole Barnett Shale section. Further, in this exemplary embodiment of the algorithm, in an eighth stage 48, if the UCS value at a given depth is < than a give value $*UCS_{max}$, (such that the value is between about 3 and about 8) the weight percentage of total organic carbon is > a given value (such that the value is between about 4 and about 9) (organic-rich zone), and the interval is identified as siliceous mudstone facies, then the zone is labeled as a preferred perforating interval. In a ninth stage 49, if, on the other hand, the UCS value at given depth is > than a given value $*UCS_{max}$ (such that the value is between about 4 and about 9) and the interval is identified as a calcareous mudstone facies or phosphatic zone, then the interval is labeled as a zone for possible fracture energy attenuation.

Now with further regard to logging programs and inputs to the expert system 40, various combinations of inputs are discussed. Although the following discussion generally is in the context of shale and shale gas reservoirs, it should be recognized that various adaptations may be had.

A first combination includes use of an instrument referred to as a density logging sonde, along with a gamma ray-logging sonde. For perspective, the density logging sonde generally provides both formation bulk density and the photoelectric absorption index (Pe) data. These measurements allow evaluation of complex formations determining lithology and porosity in such formations. Because the photoelectric absorption of gamma rays depends strongly on atomic number, the measured values of Pe are directly related to the formation's composition. The Pe measurement is not significantly dependent on porosity or fluid content, making it particularly useful in determining formation lithology. Instrument features that enhance quality include scintillation detectors for increased count rates and improved repeatability, 256-channel spectrum recording for advanced signal processing, real-time gain compensation for temperature-related changes in detector response, compensation of bulk density for variable mudcake composition and thickness and dewar flasks that protect heat-sensitive down-hole electronics for use in higher temperature wells.

In this first combination, a gamma ray log may be used to identify shale gas intervals in general (that is, Barnett Shale proper as distinguished from carbonates below and above). The bulk density curve may be used to calculate TOC from a corresponding empirical correlation. Further, total porosity can be computed from bulk density. For example, by assuming grain density of 2.72 g/cc (average value for Barnett Shale), or from neutron porosity using a correlation as appropriate. Further, if drill cuttings are available, a thermal maturity analysis can be performed, providing information for simple gas risk analysis. Together with logging data, this analysis helps to assess the gas prospect of a well. Core data may be used to provide more accurate and reliable information, including mineralogy, porosity, and sorbed gas content from the Langmuir isotherm, and should be taken whenever possible. In the absence of core data, cuttings analysis may be considered.

A second combination includes output from density and natural gamma ray sondes. Acquiring spectral gamma ray data or similar equipment can provide further benefits. For example, shale gas intervals may identified with a much higher degree of reliability, such as by using the Th/U ratio. The weight fraction of TOC and total porosity may also be computed using the same approach as in the first combination. Further, phosphatic zones (containing apatite) may be identified from various crossplots. Subsequently, the total organic carbon (TOC) may then be determined from empirical correlation with uranium taking into account the phospatic zones and compared to the TOC derived from bulk density correlation. In addition, Th/U versus U curve overlays may be used to distinguish between leached continental and fixed marine zones. The former are siltier intervals preferable for placing perforations and initiating hydraulic fracturing. These zones are identified as zones where U and Th/U curves come closer to each other.

A third combination includes instrumentation of the first combination with an instrument providing nuclear magnetic resonance data (NMR), from the NMR sonde. The addition of the NMR capabilities provides an additional independent measurement of total porosity. Intervals associated with a leached continental environment as well as higher NMR porosity are the best choices for perforating.

A fourth combination includes instrumentation of the second combination with instrumentation that provides geochemical data, such as the geochemical logging sonde. The addition of the geochemical data provides a lot of valuable information and significantly improves the quality of both the evaluation and the deliverables. Using geochemical data, mineralogy at each depth may be computed, such as by using software, and may provide for direct computation of TOC and apatite. Software may also be used to bring logging curves closer to each other, reduce data scatter, and compute total porosity through various techniques. Further, total porosity can be computed either from bulk density or neutron porosity. In addition, using geochemical data and natural gamma data, depositional facies may be identified. In general, it is considered that zones determined as siliceous mudstone are preferable perforating intervals, while calcareous mudstone and phosphatic intervals should be considered as possible zones of fracture energy attenuation.

In a fifth combination, acoustic data is used in combination with inputs from the fourth combination. The addition of the acoustic data can provide information about the geomechanical properties of the formation. Mineralogy together with total porosity can be used as an input to compute the static elastic moduli of the formation. The UCS (Unconfined Compressive Strength) curve may also then used to identify preferred perforating intervals and zones of fracture energy attenuation.

In a sixth combination, in addition to all the tools considered above (including use of NMR for total porosity determinations), an image log may be used. Exemplary image logs include those from a resistivity image or an acoustic image. The image log aids in identifying natural and drilling induced fractures, determination of the direction of horizontal stresses, improve facies determination analysis, correlation and identification of perforating intervals and zones of fracture energy attenuation, and optimization of the completion program in general. Together with cuttings analysis or core data, this logging suite is considered to provide a complete set of tools necessary for the reliable evaluation of gas reservoirs.

In summary, reliable evaluation of gas reservoirs may be performed using an expert system 40 that incorporates an understanding of the geologic setting and geochemical analysis. With use of logging data, an algorithm for identifying depositional facies and classifying them based on their petrophysical and geomechanical properties provides a basis for choosing intervals within a well that are preferable for placing perforations and intervals that may serve as zones of fracture energy attenuation. Together with the quantified lithology and mineralogy of the formation, the expert system 40 provides a complete and accurate petrophysical and geological description of respective formations. At the same time, the expert system 40 can serve as a basis for a strategy to reduce completion costs by suggesting preferable intervals for perforating, optimizing expenses, and maximizing well productivity.

In support of the teachings herein, various analysis components may be used, including digital and/or an analog systems. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing for aspects of the teachings herein. For example, a sample line, sample storage, sample chamber, sample exhaust, pump, piston, power supply (e.g., at least one of a generator, a remote supply and a battery), vacuum supply, pressure supply, refrigeration (i.e., cooling) unit or supply, heating component, motive force (such as a translational force, propulsional force or a rotational force), magnet, electromagnet, sensor, electrode, transmitter, receiver, transceiver, antenna, controller, optical unit, electrical unit or electromechanical unit may be included in support of the various aspects discussed herein or in support of other functions beyond this disclosure.

One skilled in the art will recognize that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for evaluating an earth formation from a wellbore, the method comprising:
   collecting, by a logging sonde in the wellbore, at least one of geochemical data, petrophysical data and geomechanical data from the wellbore;
   identifying, by a processor, depositional facies of the earth surrounding the wellbore, wherein identifying the depositional facies comprises estimating a weight fraction of one or more of apatite, carbonate, pyrite and uranium in the depositional facies; and
   determining, by the processor, a zone of optimal fracture initiation based on the estimating the weight fraction of one or more of apatite, carbonate, pyrite and uranium in the identified depositional facies.

2. The method as in claim 1, wherein the geochemical data is provided by geochemical logging sonde data comprising at least one of natural gamma data and pulsed neutron data.

3. The method as in claim 1, wherein the geomechanical data is provided by at least one of acoustic data, density data, resistivity data and image data.

4. The method as in claim 1, wherein at least one of the geochemical data and the geomechanical data is derived from at least one of a core sample and a cutting sample from the wellbore.

5. The method as in claim 1, wherein the geochemical data comprises an identity of at least one of silicon (Si), calcium (Ca), iron (Fe), aluminum (Al), magnesium (Mg), titanium (Ti), gadolinium (Gd), carbon (C), sulfur (S), potassium (K), uranium (U) and thorium (Th).

6. The method as in claim 1, wherein the geochemical data is estimated as at least one of a weight fraction and a concentration.

7. The method as in claim 1, wherein the identifying comprises at least one of estimating total organic carbon (TOC), a zone for perforation, and a zone for attenuation of fracture energy.

8. The method as in claim 1, wherein identifying comprises identifying at least one of illite, smectite, kaolinite, chlorite, glauconite, kerogen, coal, apatite, zeolites, salt, anhydrite, hematite, pyrite, siderite, dolomite, calcite, k-feldspar, plagioclase, and quartz.

9. The method as in claim 1, wherein identifying comprises identifying at least one of siliclastic shale, organic-rich, calcareous mudstone, siliceous mudstone, a phosphatic zone, low-organic shale, a pyritic zone, and non-siliceous organic-rich shale.

10. The method as in claim 1, wherein collecting comprises performing at least one logging of mechanical properties, geomechanical software analysis and unconfined compressive strength (UCS) analysis.

11. The method of claim 1, wherein identifying the depositional facies comprises:
   estimating at least a weight fraction of a mineral identified by the at least one of geochemical data, petrophysical data and geomechanical data.

12. The method of claim 11, wherein estimating at least the weight fraction of the mineral comprises computing a weight fraction of carbonate, the method further comprising:
   categorizing the zone as a calcareous zone if the weight fraction of carbonate is greater than a second given value between about 0.01 to about 0.25; and
   computing a weight fraction of pyrite if the weight fraction of carbonate is not greater than a given value between about 0.01 to about 0.25.

13. The method of claim 11, wherein estimating at least the weight fraction of the mineral comprises computing a weight fraction of pyrite, the method further comprising:
   categorizing the zone as a pyritic concretion if the weight fraction of pyrite is greater than a given value * $P_{max}$, the given value between about 0.4 and about 1.0, where $P_{max}$ represents a maximal weight fraction of pyrite for the deposit; and
   computing a concentration of uranium and a ratio of the concentration of uranium to thorium if the weight fraction of pyrite is not greater than the given value * $P_{max}$.

14. The method of claim 11, wherein estimating at least the weight fraction of the mineral comprises computing a weight fraction of uranium, the method further comprising:
   categorizing the zone as at least one of black shale and non-silicious black shale if the concentration of uranium is greater than a value in ppm between about 3 and about 10 ppm and Th/U is less than a given value between about 0.5 and about 3.

15. The method of claim 11, wherein estimating at least the weight fraction of the mineral comprises computing a weight fraction of uranium, the method further comprising:
   categorizing the zone as at least one of silicious mudstone and low organic shale if the concentration of uranium is not greater than a value in ppm between about 3 and about 10 ppm or if Th/U is not less than a given value between about 0.5 and about 3.

16. A method for evaluating an earth formation from a wellbore, the method comprising:
   collecting, by a logging sonde, at least one of geochemical data, petrophysical data and geomechanical data from a wellbore; and
   identifying, by a processor, depositional facies of the earth surrounding the wellbore, wherein identifying the depositional facies comprises:
   estimating, by the processor, at least a weight fraction of one or more of apatite, carbonate, pyrite and uranium identified by the at least one of geochemical data, petrophysical data and geomechanical data; and
   classifying, by the processor, a zone in the wellbore as one of a perforation zone and a zone of fracture energy attenuation according to the estimating at least the weight fraction of the one or more of apatite, carbonate, pyrite and uranium.

17. The method of claim 16, wherein estimating at least the weight fraction of the mineral comprises computing a weight fraction of apatite.

18. The method of claim 16, wherein estimating at least the weight fraction of the mineral comprises computing a weight fraction of apatite, and identifying depositional facies includes categorizing the zone as a phosphatic zone if the weight fraction of apatite is not greater than a given value between about 0.05 to about 0.15; and     computing a weight fraction of carbonate when the weight fraction of apatite is greater than the first given value between about 0.05 to about 0.15.

19. The method of claim 16, wherein estimating at least the weight fraction of the mineral comprises computing a weight fraction of apatite, and identifying depositional facies includes computing a weight fraction of carbonate when the weight fraction of apatite is greater than a given value between about 0.05 to about 0.15.

20. The method of claim 16, wherein estimating at least the weight fraction of the mineral comprises computing a weight fraction of carbonate, the method further comprising:

categorizing the zone as a calcareous zone if the weight fraction of carbonate is greater than a given value between about 0.01 to about 0.25; and     computing a weight fraction of pyrite if the weight fraction of carbonate is not greater than the given value between about 0.01 to about 0.25.

21. The method of claim 16, wherein estimating at least the weight fraction of the mineral comprises computing a weight fraction of pyrite, the method further comprising:

categorizing the zone as a pyritic concretion if the weight fraction of pyrite is greater than a given value * $P_{max}$, the given value between about 0.4 and about 1.0, where $P_{max}$ represents a maximal weight fraction of pyrite for the deposit; and     computing a concentration of uranium and a ratio of the concentration of uranium to thorium if the weight fraction of pyrite is not greater than the given value * $P_{max}$.

22. The method of claim 16, wherein estimating at least the weight fraction of the mineral comprises computing a weight fraction of uranium, the method further comprising:

categorizing the zone as at least one of black shale and non-silicious black shale if the concentration of uranium is greater than a value in ppm between about 3 and about 10 ppm and Th/U is less than a given value between about 0.5 and about 3.

23. The method of claim 16, wherein estimating at least the weight fraction of the mineral comprises computing a weight fraction of uranium, the method further comprising:

categorizing the zone as at least one of silicious mudstone and low organic shale if the concentration of uranium is not greater than a value in ppm between about 3 and about 10 ppm or if Th/U is not less than a given value between about 0.5 and about 3.

\* \* \* \* \*